United States Patent [19]

Kawanishi et al.

[11] Patent Number: 4,536,437

[45] Date of Patent: Aug. 20, 1985

[54] ELECTROTHERMIC NON-IMPACT RECORDING MATERIAL

[75] Inventors: Toshiyuki Kawanishi; Yukio Tabata, both of Numazu, Japan

[73] Assignee: Ricoh Company, Ltd., Tokyo, Japan

[21] Appl. No.: 566,234

[22] Filed: Dec. 28, 1983

[30] Foreign Application Priority Data

Dec. 28, 1982 [JP] Japan .............................. 57-229215
Dec. 28, 1982 [JP] Japan .............................. 57-229216

[51] Int. Cl.³ ............................................... B41M 5/26
[52] U.S. Cl. ...................................... 428/212; 219/216; 400/120; 428/207; 428/216; 428/336; 428/474.4; 428/474.7; 428/474.9; 428/475.5; 428/475.8; 428/476.3; 428/488.1; 428/913; 428/914
[58] Field of Search .......................... 219/216, 216 PH; 400/120; 428/474.4, 475.5, 488.1, 913, 914, 195, 207, 212, 213, 215, 216, 334–337, 339, 474.7, 474.9, 475.8, 476.3

[56] References Cited

U.S. PATENT DOCUMENTS 4,461,586  7/1984  Kawanishi et al. ................. 400/120

FOREIGN PATENT DOCUMENTS 0195695  12/1982  Japan ........................... 219/216 PH Primary Examiner—Bruce H. Hess
Attorney, Agent, or Firm—Flynn, Thiel, Boutell & Tanis

[57] ABSTRACT

In an electrothermic non-impact image transfer recording material for use in an electrothermic non-impact recording method in which the electrothermic non-impact image transfer recording material is superimposed on a recording sheet, a recording electrode with multiple recording styli and a return electrode are placed in contact with the recording material, and image-delineating signal voltage is applied across the recording material through the recording electrode and the return electrode, so that an ink is transferred imagewise from the recording material to the recording sheet, the improvement wherein the electrothermic non-impact image transfer recording material comprises a base layer and an ink layer, with an intermediate layer interposed between the two layers when necessary, and the base layer comprises as the main components a polyamide resin binder, such as an aromatic polyamide or nylon, and carbon black.

21 Claims, 4 Drawing Figures

ELECTROTHERMIC NON-IMPACT RECORDING MATERIAL

BACKGROUND OF THE INVENTION

The present invention relates to an electrothermic non-impact recording material, and more particularly to an electrothermic non-impact image transfer recording material for use with noiseless typewriters, computer output apparatus or facsimile apparatus.

In accordance with the remarkable development of the performance of computers and facsimile apparatus, printers which serve as the terminal apparatus thereof have become important apparatus. The printers for use with computers and facsimile apparatus can be roughly classified into two categories, an impact-type printing system (i.e., a mechanical printer) and a non-impact-type printing system. As the recording system which belong to the non-impact-type printing system, the following five systems are known: (1) electrophotographic recording system, (2) thermosensitive recording system, (3) electrical discharge recording system, (4) thermosensitive image transfer recording system and (5) electrothermic image transfer recording system.

The first mentioned impact-type printer has the shortcoming that it generates noise during operation because of its mechanical structure, and this shortcoming cannot be avoided.

The non-impact-type recording system has the advantage that it does not generate noise during operation, but it has several problems as well. For instance, in the electrophotographic recording system, a complex process comprising five steps, charging, exposure, development, image transfer and cleaning, is required, and this system is still unreliable in obtaining good quality transferred images. Furthermore, it is difficult to produce a small-size apparatus using the electrophotographic recording process.

The thermosensitive recording system has the shortcoming that the preservability of a thermosensitive recording material for use in that system has not been improved enough for practical use. Further, it has the shortcoming that the thermosensitive recording material cannot be plain paper, but it is made of processed paper.

The electrical discharge recording system has the advantage that image transfer can be performed to plain paper by electrical discharge, but it has the shortcoming that unpleasant odor comes out or burning dust is produced by the electrical discharging.

The thermosensitive image transfer system has the shortcoming that images with high resolution cannot be obtained because of the use of a thermal head when printing. The maximum image resolution that is obtained at present is in fact about 10 lines/mm. Further, this sytem has the shortcoming that the recording speed is as slow as about 1 msec/dot.

Unlike the above-mentioned non-impact-type printing system, the electrothermic non-impact-recording system has the advantages that images with high resolution can be obtained on plain paper with high recording speed, and the apparatus for this system can be made compact in size. Due to such advantages thereof, several proposals have been made for further improvement of electrothermic non-impact recording materials for use with this system.

For example, in Japanese Laid-Open patent application No. 54-87234, there is proposed an electrothermic non-impact recording material comprising an electroconductive support material and an image transfer layer formed thereon, which image transfer layer comprises as the main components a colorant and a thermoplastic polymeric resin which is soluble in a solvent, by which solvent the support material is not damaged even if it comes into contact with the solvent, and which thermoplastic polymeric resin has a softening point lower than that of the support material. In this electrothermic non-impact recording material, it is preferable that the support material which serves as a base layer be made of a polycarbonate resin with electroconductive carbon black particles dispersed therein. In the electrothermic non-impact recording material disclosed in this patent application, the image transfer layer which serves as an ink layer has excellent resistance to friction, but its mechanical strength is not enough for practical use, which is a shortcoming of this recording material.

In Japanese Patent Publication No. 55-12394, Japanese Laid-Open patent application No. 53-7246, Japanese Laid-Open patent application No. 56-8276 and Japanese Patent Publication No. 55-12393, there are proposed two-layered type electrothermic non-impact recording materials, each comprising an anisotropically electroconductive base layer or a metal-powder-dispersed electroconductive base layer, and an electroconductive ink layer formed thereon. The anisotropically electroconductive base layer is expensive since it is produced by a complex production method by use of expensive materials, such as metal powder. In the case of the metal-powder-dispersed electroconductive base layer, it is extremely difficult to disperse the metal powder uniformly in the layer. Therefore, the electrothermic non-impact recording materials disclosed in the above patent publications and applications have the shortcoming that high resolution cannot be obtained because of the non-uniformity of the dispersion of the metal powder in the base layer by which non-uniformity printed dots are deformed.

In other conventional electrothermic image transfer recording materials, the layer which comes into contact with the recording styli of recording electrodes does not have sufficient resistance to heat and mechanical strength, so that the layer is easily damaged by the heat necessary for forming images with high dot density, and the recording styli are easily smeared by the materials coming from the layer. By these shortcomings, high dot-image density, which could be obtained by application of high voltage and large electric current, cannot be obtained. In contrast to this, if the thermal resistance of the layer is improved in the conventional electrothermic image transfer recording materials, the flexibility necessary for practical use thereof is lost and they become easily torn, with the result that it is difficult to perform smooth scanning of the recording styli on the recording materials.

A conventional electrothermic recording material composed of a plurality of layers has the shortcoming that part of the base layer is transferred together with the ink layer in the image transfer step, resulting in that the density and shape of printed dots become non-uniform and the quality of the dot images is inferior to that obtained by the conventional single-layer-type electrothermic image transfer recording materials.

As mentioned above, in the conventional electrothermic image transfer recording materials, since the mechanical strength of the layer which comes into contact with the recording styli is insufficient, the utmost care has to be taken when producing, loading in cartridges or transporting the recording materials.

SUMMARY OF THE INVENTION

It is therefore an object of the present invention to provide an electrothermic non-impact image transfer recording material which is capable of yielding dots with high density and high quality and which has high mechanical strength, in particular, high tensile rupture, high durability and high heat resistance.

Another object of the present invention is to provide an electrothermic non-impact image transfer recording material of the above-mentioned type which can be handled without particular care.

The above objects of the present invention can be attained by an electrothermic non-impact image transfer recording material comprising a base layer and an ink layer formed thereon, with an intermediate layer being interposed between the two layers when necessary, the base layer comprising as the main components a polyamide resin binder and carbon black. When this electrothermic non-impact image transfer recording material is used, it is superimposed on a recording sheet, and a recording electrode with multiple recording styli embedded therein and a return electrode are placed in contact with the recording material, and image-delineating signal voltage is applied across the recording material through the recording electrode and the return electrode, so that an ink is transferred imagewise from the recording material to the recording sheet, whereby images are printed on the recording sheet.

DETAILED DESCRIPTION OF THE PREFERRED EMBODIMENTS

By referring to the accompanying drawing, the present invention will now be explained in detail.

Figure 1:
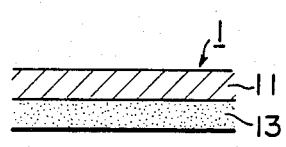
FIG. 1 is an enlarged schematic cross-sectional view of an embodiment of an electrothermic non-impact image transfer recording material according to the present invention.

FIG. 1 is an enlarged schematic cross-sectional view of an embodiment of an electrothermic non-impact image transfer recording material 1 according to the present invention. In the figure, the recording material 1 is of a two-layered type, which comprises a base layer 11 and an ink layer 13.

Figure 2:
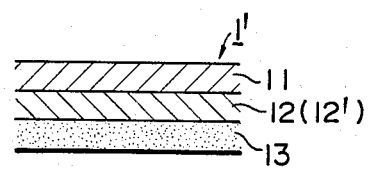
FIG. 2 is an enlarged schematic cross-sectional view of another embodiment of an electrothermic non-impact image transfer recording material according to the present invention.

FIG. 2 is an enlarged schematic cross-sectional view of another embodiment of an electrothermic non-impact image transfer recording material 1' according to the present invention. The recording material 1' is of a three-layered type, which comprises the base layer 11, and an intermediate layer 12 and the ink layer 13. The intermediate layer 12 can be replaced with a modified intermediate layer 12' which will be explained later.

In the electrothermic non-impact image transfer recording materials according to the present invention, there are two types. In the first type, Joule's heat is generated within the base layer 11, while in the second type, Joule's heat is generated within the ink layer 13.

In the two types of the recording materials, the relationship between the electric resistances of the two layers is different as will be explained later. In both types, however, it is required that the base layer 11 with which the recording styli come into contact be highly resistant to heat, since the base layer 11 has to protect the recording material from being damaged by heat and to protect the recording styli from being smeared with the materials which may come from the recording material by the contact of the styli with the recording material and which may adhere to the styli. Furthermore, it is necessary that the ink layer 13 have a relatively low softening point. In the case of the second type recording material having the intermediate layer 12, more heat is generated in the intermediate layer 12 than in the ink layer 13. In this case, it is necessary that the intermediate layer 12 be made of a flexible film layer. The advantages of interposing the intermediate layer 12 between the base layer 11 and the ink layer 13 will be explained later.

In the recording material 1 as shown in FIG. 1 and of the first type in which the Joule's heat is generated within the base layer 11, in order to cause each of the above-mentioned layers to perform its function effectively, it is necessary that the electric resistance of the ink layer 13, $R_I$, be greater than the electric resistance of the base layer 11, $R_B$, that is $R_I > R_B$. In the recording material 1 as shown in FIG. 1 and of the second type in which the Joule's heat is generated within the ink layer 13, it is necessary that the electric resistance of the base layer 11, $R_B$, be greater than the electric resistance of the ink layer 13, $R_I$, that is $R_B > R_I$.

In the recording material 1' as shown in FIG. 2 and of the first type in which the Joule's heat is generated within the base layer 11, it is necessary that the resistance of the intermediate layer 12, $R_M$, the electric resistance of the ink layer 13, $R_I$, and the electric resistance of the base layer 11, $R_B$, be in the relationship of $R_M \geq R_I > R_B$ or $R_I > R_M > R_B$. Furthermore, in the second type in which the Joule's heat is generated within the ink layer 13 as shown in FIG. 2, it is necessary that the respective electric resistances of those layers be in the relationship of $R_M \geq R_B > R_I$ or $R_B > R_M > R_I$.

By the above described relationship of the electric resistance of each layer, in the recording material 1' as shown in FIG. 2, the intermediate layer 12 serves not only to cause the base layer 11 to adhere to the ink layer 13, but also to prevent excessive heat generation in the base layer 11, thereby preventing the base layer 11 from being damaged by the heat and from the recording styli being smeared with the materials coming from the heated base layer 11, and reducing the contact friction between the base layer 11 and the recording styli, thus the electric current flows within the portions of the ink layer 13 right under the recording styli, so that each dot is clearly marked and sharp images can be produced without halos.

When a material which facilitates the peeling of the intermediate layer 12 off the base layer 11 is employed in the intermediate layer 12, a more preferable recording material according to the present invention can be obtained. Reference numeral 12′ in FIG. 2 indicates such improved intermediate layer. If a recording material having the intermediate layer 12′ is employed in the manner as shown in the FIG. 3, the heat generated by the electric current from the stylus 3 is concentrated in only a portion of the intermediate layer 12′ and only that portion is peeled off the base layer 11 together with the corresponding portion of ink layer 13 to the recording sheet 2, whereby sharp images with uniform density can be obtained.

The materials for constituting the above-mentioned layers as follows:

It is required that the materials for use in the base layer 11 have high heat resistance and high mechanical strength, in particular, high tensile rupture, in order to work the recording material into, for instance, an ink sheet or an ink ribbon, which is not susceptible to shocks, for the convenience of the production thereof, for loading the recording material in cartridges and for easy transportation thereof. For this purpose, in the present invention, as the material for the base layer 11, a sheet comprising as the main components a polyamide resin, in particular an aromatic polyamide or nylon, and carbon black which serves as an electroconductive agent, is employed. The ratio of the amount of the polyamide resin, such as an aromatic polyamide or nylon to the amount of carbon black in the base layer is preferably in the range of 70% to 97% by weight of the polyamide resin to 3% to 30% by weight of carbon black.

Such aromatic polyamides for use in the present invention are described, for instance, in Japanese Laid-Open patent application No. 53-35797. More specifically, it is preferable to use aromatic polyamides of the following general formulas in the present invention:

wherein $Ar_1$, $Ar_2$ and $Ar_3$ each represent an aromatic group having a valence of 2, which can be identical or different. Specific representative examples of the aromatic polyamides are as follows:
 poly(m-phenyleneisophthalamide),
 poly(m-phenyleneterephthalamide),
 poly(p-phenyleneisophthalamide),
 poly(p-phenyleneterephthalamide),
 poly(4,4′-oxydiphenyleneterephthalamide),
 poly(4,4′-oxydiphenyleneisophthalamide),
 poly(m-benzamide), and
 poly(p-benzamide).

Of the above-mentioned aromatic polyamides, poly(m-phenyleneisophthalamide) and poly(m-phenylene telephthalamide) are particularly useful, because they are very soluble in many solvents and solutions of the polyamides with high concentration can be prepared, so that film formation of the polyamides can be easily done by a wet molding method. As the solvent for the film formation, N,N-dimethylformamide, dimethylacetamide, N-methyl-2-pyrrolidone are particularly suitable.

The above-mentioned aromatic polyamides can be used alone or in combination. It is preferable that the softening point of the aromatic polyamides be 180° C. or more for the formation of the base layer 11.

As the nylon for use as the binder agent for the formation of the base layer 11, for instance, nylon 6, nylon 66, nylon 610, nylon 11 and nylon 12 can be used. The nylon 66 has a thermal deformation temperature as high as 180° C. and is relatively hard. Therefore, it is suitable for making a relatively thick film. In contrast to this, nylon 6 has a lower thermal deformation temperature, 150° C., and is more flexible than nylon 66. Therefore, it is suitable for the formation of a thin film.

The above-mentioned nylons can be employed alone or in combination. By use of these nylon binders in the base layer 11, the mechanical strength, in particular, tensile rupture, of the recording material can be significantly improved. This is probably because the nylon binders comprise chain polymers that are flexible and can be greatly elongated. It is preferable that the softening point of the nylon binders for the base layer 11 be 150° C. or more.

It is preferable that the softening point of the resins for use in the intermediate layer 12 (or in the modified intermediate layer 12′) be 150° C. or more. A resin whose softening point is lower than 150° C. is poor in film formation properties and is easily softened or melted by the heat generated therein when electric current is caused to pass therethrough. Therefore, a resin with such a low softening point is not suitable for use in the intermediate layer 12 or 12′.

Specific examples of the resins which are suitable for use in the intermediate layer 12 are as follows:
 vinyl chloride—vinyl acetate copolymer,
 vinyl chloride—vinylidene chloride copolymer,
 vinyl chloride—acrylonitrile copolymer,
 acrylic acid ester—acrylonitrile copolymer,
 acrylic acid ester—vinylidene chloride copolymer,
 acrylic acid ester—styrene copolymer,
 methacrylic acid ester—vinylidene chloride copolymer,
 methacrylic acid ester—acrylonitrile copolymer,
 methacrylic acid ester—styrene copolymer,
 urethane elastomer,
 nylon-silicone type resin,
 nitrocellulose-polyamide resin,
 polyvinyl fluorine,
 vinylidene chloride—acrylonitrile copolymer,
 butadiene—acrylonitrile copolymer,
 polyamide resin,
 polyvinyl butyral,
 cellulose derivatives (for instance, cellulose acetate butyrate, cellulose diacetate, cellulose triacetate, cellulose propionate and nitrocellulose),
 polycarbonate,
 styrene-butadiene copolymer,
 polyester resin,
 chlorovinyl ether—acrylic acid ester copolymer,
 amino resin,
 synthetic rubbers,
 thermoplastic resins, and mixtures thereof.

In addition to the above, cellulose acetate with a plasticizer added thereto; polycarbonate, unhardened polyester (solution type), polyvinyl alcohol, nylon, styrene-butadiene copolymer (a low styrene content type), styrene-acryl copolymer and styrene with a plasticizer added thereto; vinyl chloride—vinyl acetate copolymer, polyvinyl butyral, and the above-mentioned resins with a flexibilizing agent added thereto.

As the flexibilizing agent, phthalic acid ester, phosphoric ester, fatty acid ester, glycols and oils can be employed.

As mentioned previously, in order to facilitate the transfer of the ink from the ink layer to the recording sheet, resins having a peel-off effect can be used in the intermediate layer 12'. Examples of such resins are silicone resin, methyl methacrylate, polyethylene, polypropylene, fluorine-containing polymers, polyvinyl alcohol, binders containing inorganic oxide such as silicon oxide or carbonate such a magnesium carbonate, rubber chloride and commercially available peel-off agents such as myristic acid chromic chloride.

It is preferable that the electric resistance of the above-mentioned intermediate layer 12 (including the intermediate layer 12') be as high as $10^4 \sim 10^6 \Omega$ in order to attain effective heat generation. In order to make the ink dots sharp, it is preferable that the electric resistance of the intermediate layer 12 be in the range of $10^0 \sim 10^3 \Omega$.

As the resins for the formation of the ink layer 13, it is preferable that the softening point or the melting point thereof be in the range of 50° C. to 200° C., more preferably in the range of 60° C. to 120° C. Preferable examples of such resins for use in the ink layer 13 are a low molecular weight polystyrene, styrene butyl methacrylate copolymer, a low molecular weight polyamide, and the mixtures of the above-mentioned polymers. To the ink layer 13, waxes such as Carnauba wax, oils such as linseed oil and a variety of modified rosins can be further added.

The function of the ink layer 13 is to allow the electric current to pass therethrough in exactly the same shape as the contact area of each of the recording styli (square or round) with the base layer 11 and to transfer the melted portion by the consumption of a small amount of thermal energy to the recording sheet 2. Therefore, it is necessary that the resins employed in the ink layer 13 have a softening point or melting point in the above-mentioned range. When the softening point or melting point of the resins is lower than 50° C., the background of the recording sheet 2 becomes easily smeared when printing is performed. In contrast to this, when the softening point or melting point of the resin is higher than 200° C., thermal ink transfer cannot be done by the consumption of a small amount of thermal energy.

In the ink layer 13, there is dispersed a coloring component such as a coloring pigment or a coloring dye. This coloring component is transferred to the recording sheet 2 when non-impact recording is done, together with the binder resin which exists around the coloring component in the ink layer 13. As such a coloring component, carbon black, in particular, furnace type carbon black, acetylene black, lamp black, organic or inorganic dye or pigments for color image formation such as phthalocyanine, alkali blue, spirit black, benzidine yellow, fast red, crystal violet, iron oxide and cadmium sulfide can be employed.

When preparing the recording material according to the present invention, in order to adjust the electric resistance of each of the base layer 11, the intermediate layer 12 (or the intermediate layer 12') and the ink layer 13 in compliance with the previously described relationship, a variety of organic or inorganic electroconductive materials can be added to any of the layers. As such electroconductive materials, electroconductive carbon black can be employed, which also serves as a coloring component. In addition to that, ordinary carbon black, graphite and oil black can also be employed as the electroconductive materials.

The recording material according to the present invention can be prepared as follows: (a) A resin for preparing the base layer 11 is melted at temperatures of 200° C. to 300° C. and the melted resin is extruded from a T-type die casting machine, so that a film which serves as the base layer 11 is prepared. To this film base layer 11, an ink layer formation liquid and an intermediate layer formation liquid are successively applied and are then dried, whereby the recording material according to the present invention is prepared. (b) A base layer formation liquid, an ink layer formation liquid and an intermediate layer formation liquid are respectively applied to each glass plate or metallic plate and are then dried, whereby each layer is prepared by peeling the layer off each glass plate or metallic plate. The thus prepared layers are superimposed, whereby the recording material according to the present invention is prepared.

In the present invention, it is preferable that the thickness of the ink layer 13 be in the range of 1 $\mu$m to 10 $\mu$m, more preferably in the range of 2 $\mu$m to 4 $\mu$m, the thickness of the intermediate layer 12 or 12' be in the range of 0.5 $\mu$m to 20 $\mu$m, and the thickness of the base layer 11 be in the range of 0.5 $\mu$m to 20 $\mu$m.

As the solvents for preparing the above-mentioned layers, in addition to the previously mentioned N,N-dimethylformamide, dimethylacetamide and N-methyl-2-pyrrolidone, for instance, tetrahydrofuran, 1,2-dichloroethane, methyl ethyl ketone, toluene, petroleum ether, ethylacetate and methanol can be employed.

Figure 3:
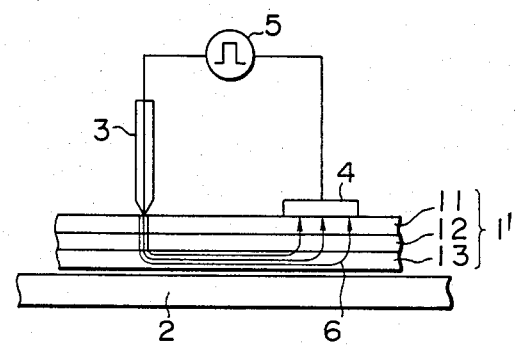
FIG. 3 is a schematic illustration in explanation of an electrothermic recording process by use of the electrothermic non-impact image transfer recording material as shown in FIG. 2.

Electrothermic non-impact image transfer recording by use of the thus prepared electrothermic image transfer recording material according to the present invention can be performed as follows:

As in a conventional method as shown in FIG. 3, the ink layer 13 is closely superimposed on the recording sheet 2, and a return electrode 4 and a recording stylus 3 are placed in contact with the base layer 11 formed on the intermediate layer 12. Image-delineating signal voltage is then applied from an image signal voltage application apparatus 5, so that recording electric current 6 as shown by the arrow is caused to pass through the ink layer 13. In this case, the recording material is of the second type in which Joule's heat is generated within the ink layer 13.

When the electric current is caused to pass through the recording material 1', the electric current density becomes maximum immediately under the recording stylus 3. In contrast to this, since the contact area of the the return electrode 4 with the recording material 1' is greater than that of the recording stylus 3, the electric current density in the recording material 1' decreases towards the return electrode 4. The result is that the ink layer 13 right under the recording stylus 3 is softened or melted by the Joule's heat generated by this electric current, so that the softened or melted portion of the ink layer 13 is transferred imagewise to the recording sheet 2, corresponding to the image-delineating signals applied to the recording stylus 3, whereas no ink layer portions are transferred to the recording sheet under the return electrode 4.

The conditions of applying electric current to the recording material and the number of the scanning lines have significant effects on the image formation. Generally, in this invention, the voltage of the image-delineating signals is in the range of 10 volts to 200 volts and the application time thereof is in the range of 0.05 msec to 1 msec, with the number of scanning lines being in the range of about 3 to 20 lines/mm. In the recording material according to the present invention, even if relatively large electric current is applied to the recording material, it does not occur that all the coloring component is transferred at a time to the recording sheet 2. Therefore, the recording material according to the present invention can be used in repetition.

The above described electrothermic image transfer recording method is explained based on the use of the recording material 1' as shown in FIG. 2. This recording method can also apply to the recording material 1 as shown in FIG. 1.

As explained as above in detail, in the present invention, high quality images can be formed on a recording sheet such as plain paper, with the consumption of a small amount of thermal energy and at high speed. This can be attained by the recording material of a two-layered structure made of the base layer 11 and the ink layer 13, or by the recording material of a three-layered structure made of the base layer 11, the intermediate layer 12 or 12' and the ink layer 13, which are constructed in such a fashion that each layer can perform its function without being interfered with other layers.

Furthermore, in the present invention, by disposing the intermediate layer 12' which is particularly capable of facilitating the peeling of the ink layer 13 off the base layer 11, higher quality images can be obtained. Furthermore, the base layer 11 of the recording material according to the present invention is of a single layer type in which an electroconductive material is more uniformly dispersed than in the electrically anistropic conductive layer and which is also entirely different in structure from the conventional expensive anisotropically electroconductive base layer. Therefore, the present invention is capable of producing dot images exactly in the same shape as that of the contact area of the recording stylus with the recording material, thereby attaining high quality dot recording.

In addition to the above, in the recording material according to the present invention, the mechanical strength, in particular, the tensile rupture, of the base layer 11 is significantly improved in comparison with a conventional recording material, so that even if the recording material is worked into a sheet or a ribbon, its handling is quite easy and high performance reliability is attained.

Embodiments of an electrothermic non-impact image transfer recording material according to the present invention will now be explained in detail by referring to the following examples and comparative examples.

EXAMPLE 1

A mixture of the following components was dispersed in a ball mill for 120 hours:

|  | Parts by Weight |
| --- | --- |
| m-phenyleneterephthalamide | 9 |
| Carbon black ("Kechen Black", commercially available from Nihon E.C. Co., Ltd.) | 1 |
| Calcium chloride | 5 |
| N—methyl-2-pyrrolidone | 85 |

The above dispersion was applied to a glass plate by use of a blade with a gap between the glass plate and the blade being 200 μm and was then dried at 110° C. for 1 hour in a dryer to form a film sheet on the glass plate. Thereafter, the glass plate with the film sheet thereon was immersed in cold water at about 5° C. for 1 minute and the film sheet was peeled off the glass plate. The film was then washed in flowing water at temperatures of about 20° C. While the film was in a moist state, it was elongated double size in both length and width. Thereafter the film sheet was subjected to heat treatment at 300° C. for 10 minutes, whereby a base layer sheet with a thickness of about 20 μm and with an electric resistance of 60κΩ was prepared.

A mixture of the following components was dispersed in a ball mill for 24 hours, whereby an ink layer formation liquid was prepared.

|  | Parts by Weight |
| --- | --- |
| Oligostyrene (softening point 65° C.) | 85 |
| Carbon black ("Kechen Black", commercially available from Nihon E.C. Co., Ltd.) | 15 |
| Cyclohexane | 900 |

The above prepared ink layer formation liquid was applied to the first prepared base layer sheet by use of a blade with a gap of 100 μm between the blade and the base layer sheet and was then dried at 100° C. for 1 minute in a dryer, whereby an ink layer with a thickness of about 5 μm was formed on the base layer sheet, whereby an electrothermic non-impact image transfer recording material No. 1 according to the present invention was prepared.

The entire electric resistance of the thus prepared electrothermic recording material No. 1 was 5 kΩ. With respect to the mechanical strength of the recording material, the tensile strength was 1,200 g/20 μm and the tensile rupture was 150 g/20 μm. This mechanical strength was sufficient for practical use.

The electrothermic non-impact image transfer recording material No. 1 was superimposed on a sheet of plain paper. A recording electrode with multiple recording styli embedded therein in two rows in a zigzag shape, with the recording styli density being 8 styli/mm and each stylus having a diameter of about 60 μm, and a return electrode were placed in contact with the recording material No. 1. Thereafter image-delineating signals of 150 volts are applied through the recording electrode with an application time of 0.1 sec, whereby image recording was performed. As a result, images with a dot density of 1.4 and with a resolution of 16 dots/mm were obtained on the plain paper. The thus formed images were clear and the image density thereof was sufficiently high for practical use.

By use of this recording material, 10,000 characters were printed on a sheet of plain paper. No materials adhered to the surface of the styli of the recording electrode. This is probably because the thermal deformation temperature of the base layer of this recording material was as high as 250° C. to 300° C., so that the base layer did not adhere to the styli of the recording electrode even though the base layer was heated to high temperatures.

EXAMPLE 2

Example 1 was repeated except that as the components for preparing the base layer, a mixture of the following components was employed, whereby an electrothermic non-impact image transfer recording material No. 2 according to the present invention was prepared.

|  | Parts by Weight |
| --- | --- |
| m-phenyleneisophthalamide | 9 |

|                                                                         | Parts by Weight |
| ----------------------------------------------------------------------- | --------------- |
| Carbon black ("Kechen Black", commercially available from Nihon E.C. Co., Ltd. | 1               |
| Calcium chloride                                                        | 2               |
| Dimethylacetamide                                                       | 88              |

In the electrothermic non-impact image transfer recording material No. 2, the thickness of the base layer with about 15 μm and the electric resistance thereof was 100 kΩ. The ink layer was about 3 μm thick, and the entire electric resistance of this recording material was 10 kΩ.

The thus prepared recording material No. 2 was worked into an ink ribbon with a width of 6.35 mm and was loaded in a cartridge. Under the same conditions as in Example 1, character printing was performed by use of the ink ribbon loaded in the cartridge. As a result, clear images with a resolution of 16 dots/mm and with a dot density of 1.2 were obtained on a sheet of plain paper.

As in Example 1, 10,000 characters were printed by use of this ink ribbon. The printed image quality did not change throughout the 10,000 character printing. This is probably because, as in Example 1, the thermal deformation temperature of the base layer was high. The tensile strength of the ink ribbon was 950 g/15 μm and the tensile rupture thereof was 180 g/15 μm.

COMPARATIVE EXAMPLE 1

A mixture of the following components was dispersed in a ball mill for 24 hours, whereby a base layer formation liquid was prepared.

|                                                                         | Parts by Weight |
| ----------------------------------------------------------------------- | --------------- |
| Triacetate cellulose                                                    | 93              |
| Carbon black ("Kechen Black", commercially available from Nihon E.C. Co., Ltd.) | 7               |
| Methylene chloride                                                      | 1,400           |

The thus prepared base layer formation liquid was applied to a polyester film by a blade with a gap of 300 μm between the blade and the polyester film and was then dried at 70° C. for 1 minute in a dryer, whereby a base layer with a thickness of about 15 μm and with an electric resistance of 100 kΩ was formed.

As in Example 1, an ink layer with a thickness of about 3 μm was formed on the base layer.

Thereafter, the base layer and the ink layer were integrally peeled off the polyester film, whereby a comparative electrothermic non-impact image transfer recording material No. 1 was prepared. The entire electric resistance of this comparative recording material was 5 kΩ.

By use of the comparative recording material No. 1, printing was done under the same conditions as in Example 1. As a result, sharp images were formed with a dot density of 1.2. Since the thermal deformation temperature of the base layer of this recording material was about 180° C., the recording styli of the recording electrode were slightly smeared during the printing, but good printing quality was maintained throughout the 10,000-character printing.

With respect to the mechanical strength of this comparative recording material, the tensile strength thereof was 500 g/15 μm and the tensile rupture was 20 g/15 μm.

When this comparative recording material was worked into an ink ribbon with a width of 6.35 mm for use in a cartridge, the ribbon was frequently broken while in use within the cartridge.

COMPARATIVE EXAMPLE 2

Example 1 was repeated except that the base layer was prepared by use of a base layer formation liquid prepared by dispersing a mixture of the following components in a ball mill for 24 hours, whereby a comparative electrothermic non-impact image transfer recording material No. 2 was prepared.

|                                                                         | Parts by Weight |
| ----------------------------------------------------------------------- | --------------- |
| Polycarbonate                                                           | 9               |
| Carbon black ("Kechen Black", commercially available from Nihon E.C. Co., Ltd.) | 1               |
| 1,2-dichloroethane                                                      | 100             |

The thickness of the base layer of this comparative recording material was about 15 μm and the electric resistance thereof was 50 kΩ. The thickness of the ink layer was about 3 μm, and the entire electric resistance of the recording material was 4 kΩ.

Thereafter, the comparative recording material No. 2 was worked into an ink ribbon with a width of 6.35 mm for use in a cartridge.

Under the same conditions as in Example 1, printing was performed on a sheet of plain paper by use of the ribbon loaded in the cartridge. At the initial stage of the printing, relatively sharp images with a dot density ranging from 1.1 to 1.2 were obtained, however, in the course of printing of 100 characters to 1,000 characters, the dot density decreased to a range of 0.5 to 1.0.

It was observed after the printing that materials coming from the base layer adhered to the recording styli of the recording electrode. Probably this occurred because the thermal deformation temperature of the base layer was as low as about 120° C.

EXAMPLE 3

A dispersion of the following components was applied to the same base layer (with a thickness of about 15 μm and with an electric resistance of 100 kΩ) as that employed in Example 2 by a blade with a gap of 50 μm between the blade and the base layer, and was then dried at 80° C. for 1 minute, whereby an intermediate layer with a thickness of about 2 μm was formed on the base layer.

|                                                                         | Parts by Weight |
| ----------------------------------------------------------------------- | --------------- |
| Silicone resin                                                          | 95              |
| Carbon black ("Kechen Black", commercially available from Nihon E.C. Co., Ltd.) | 5               |
| Xylene                                                                  | 900             |

A dispersion of the following components was applied to the above-prepared intermediate layer by a blade with a gap of 100 μm between the blade and the intermediate layer and was then dried at 70° C. for 1 minute, whereby an ink layer with a thickness of about 3 μm was formed on the intermediate layer.

|  | Parts by Weight |
|---|---|
| Low molecular weight polystyrene | 80 |
| Carbon black ("Kechen Black", commercially available from Nihon E.C. Co., Ltd.) | 20 |
| Cyclohexane | 900 |

Thus, an electrothermic non-impact image transfer recording material No. 3 according to the present invention was prepared. The entire electric resistance of the recording material No. 3 was 9 kΩ.

Thereafter, thermal printing was performed with the application of image delineating signals of 100 volts and with a signal application time of 0.1 msec by use of the same apparatus as that employed in Example 1. As a result, sharp character images with a dot density of 1.5 were obtained on a sheet of plain paper. Furthermore, by use of the recording material No. 3, 10,000 characters were printed on the plain paper. Throughout this printing, the high printing quality was maintained.

Figure 4:
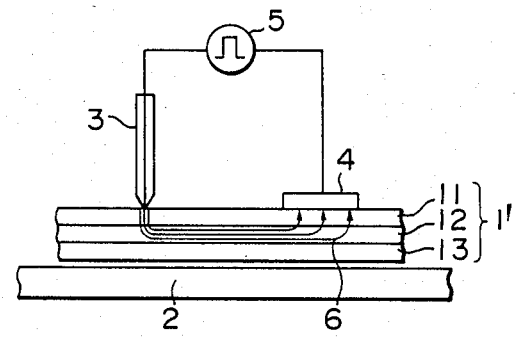
FIG. 4 is a schematic illustration in explanation of another electrothermic recording process by use of the electrothermic non-impact image transfer recording material as shown in FIG. 2.

In the case of this recording material, it is considered that heat was generated mainly in the intermediate layer as shown in FIG. 4, although it was not experimentally confirmed. In comparison with the recording materials of Example 1 and Example 2, the recording material No. 3 was capable of printing a greater number of characters in repetition, with the high printing quality maintained.

EXAMPLE 4

A mixture of the following components was sufficiently kneaded at 200° C. in a three-roll mill and was then heated to 300° C.

|  | Parts by Weight |
|---|---|
| Nylon 6 (commercially available from Toray Co., Ltd.) | 90 |
| Carbon black ("Kechen Black", commercially available from Nihon E.C. Co., Ltd.) | 10 |

The mixture was formed into a film with a thickness of about 20 μm by extruding the kneaded mixture from a T-type die casting machine, whereby a base layer was prepared. Part of the base layer was cut into the shape of a ribbon with a width of 10 mm and the electric resistance of the ribbon was measured by use of a commercially available tester, with the distance between the tester styli at 10 mm. The result was 100 kΩ.

A mixture of the following components was dispersed in a ball mill for 24 hours, whereby an ink layer formation liquid was prepared.

|  | Parts by Weight |
|---|---|
| Oligostyrene (Softening point 65° C.) | 85 |
| Carbon black ("Kechen Black", commercially available from Nihon E.C. Co., Ltd.) | 15 |
| Cyclohexane | 900 |

The thus prepared ink layer formation liquid was applied to the above prepared base layer by a blade with a gap of 100 μm between the blade and the base film, and was then dried at 100° C. for 1 minute, whereby an ink layer with a thickness of about 3 μm was formed on the base layer. Thus, an electrothermic non-impact image transfer recording material No. 4 was prepared.

The entire electric resistance of the recording material No. 4 was 5 kΩ, and the tensile strength thereof was 950 g/20 mm and the tensile rupture thereof was 100 g/20 mm. This mechanical strength was sufficient for practical use.

The recording material No. 4 was worked into an ink ribbon with a width of 6.35 mm and the ink ribbon was loaded in a cartridge. By use of the ink ribbon loaded in the cartridge, character printing was performed on a sheet of plain paper by use of a recording electrode with multiple recording styli embedded therein with a density of 8 styli/mm in two rows in a zigzag configuration, each stylus having a diameter of 60 μm, with the application of image-delineating signals of 150 volts and with a application time of 0.1 msec. As a result, clear characters were printed on the plain paper with a dot density of 1.2. This high printing quality was maintained in a prolonged printing operation.

EXAMPLES 5 AND 6 AND COMPARATIVE EXAMPLE 3

Example 1 was repeated except that the formulation of each base layer of those examples was changed as shown in Table 1, whereby electrothermic non-impact image transfer recording materials No. 5 and No. 6 in the shape of a ribbon according to the present invention and a comparative non-impact image transfer recording material No. 3 were prepared.

EXAMPLE 7

In accordance with the formulation of the base layer formation liquid described in Example 4, a base layer film with a thickness of about 15 μm was obtained.

A dispersion consisting of 95 parts by weight of polyvinyl alcohol and 5 parts by weight of "Kechen Black" was applied to the base layer film, whereby an intermediate layer with a thickness of about 5 μm and with an electric resistance of 300 kΩ, was formed on the base layer film. On the intermediate layer, there was further formed an ink layer with a thickness of about 3 μm by applying thereto a dispersion consisting of 80 parts by weight of a lower molecular weight polystyrene and 20 parts by weight of "Kechen Black", whereby an electrothermic non-impact image transfer recording material No. 7 according to the present invention was prepared.

The non-impact image transfer recording materials No. 5, No. 6 and No. 7 prepared in Examples 5, 6 and 7 and the comparative non-impact image transfer recording material No. 3 of Comparative Example 3 were subjected to electrothermic image transfer recording under the same conditions as in Example 4. The results are summarized in Table 1. In addition, the electric resistance of the base layer of each ribbon and the entire electric resistance of each recording material are also shown in Table 1.

TABLE 1

|  | Example 5 | Parts | Example 6 | Parts | Example 7 | Parts | Comparative Example 3 | Parts |
|---|---|---|---|---|---|---|---|---|
| Binder agent in the base layer | Nylon 6 | 95 | Nylon 12 | 95 | Nylon 6 | 90 | Celullose acetate | 90 |

TABLE 1-continued

| | Example 5 | Example 6 | Example 7 | Comparative Example 3 |
|---|---|---|---|---|
| Carbon black in the base layer | Kechen black 5 | Kechen black 5 | Kechen black 10 | Ketchen black 10 |
| Electric resistance of the base layer | 300 kΩ | 350 kΩ | 80 kΩ | 80 kΩ |
| Entire electric resistance of the recording material | 10 kΩ | 12 kΩ | 15 kΩ | 4 kΩ |
| Dot density | 1.0 | 1.0 | 1.1 | 1.2 |
| Dot sharpness (resolution) | High | High | High | High |
| Tensile strength | 1200 g/20 μm | 1500 g/30 μm | 800 g/23 μm | 650 g/20 μm |
| Tensile rupture | 250 g/20 μm | 200 g/30 μm | 300 g/23 μm | 30 g/20 μm |

What is claimed is:

1. In an electrothermic non-impact image transfer recording material for use in an electrothermic non-impact recording method in which the electrothermic non-impact image transfer recording material is superimposed on a recording sheet, a recording electrode with multiple recording styli and a return electrode are placed in contact with the recording material, and image-delineating signal voltage is applied across the recording material through the recording electrode and the return electrode, so that an ink is transferred image-wise from the recording material to the recording sheet, the improvement wherein said electrothermic non-impact image transfer recording material comprises at least a base layer and an ink layer, the base layer comprises as the main components a polyamide resin binder and carbon black, said polyamide resin binder is selected from the group consisting of aromatic polyamides and nylons, and said ink layer comprises a coloring component and a resin.

2. An electrothermic non-impact image transfer recording material as claimed in claim 1, wherein said polyamide resin binder is selected from the group consisting of aromatic polyamides having recurring structural units of the general formula (1) and the general formula (2), and having a softening point thereof of 180° C. or more,

$$-NH-Ar_1-NHCO-Ar_2-CO- \quad (1)$$

$$-CO-Ar_3-NH- \quad (2)$$

wherein $Ar_1$, $Ar_2$ and $Ar_3$ each represent an aromatic group having a valence of 2, each of which can be identical or different.

3. An electrothermic non-impact image transfer recording material as claimed in claim 2, wherein said aromatic polyamide is selected from the group consisting of poly(m-phenyleneisophthalamide), poly(m-phenyleneterephthalamide), poly(p-phenyleneisophthalamide), poly(p-phenyleneterephthalamide), poly(4,4'-oxydiphenyleneterephthalamide), poly(4,4'-oxydiphenyleneisophthalamide), poly(m-benzamide), and poly(p-benzamide).

4. An electrothermic non-impact image transfer recording material as claimed in claim 1, wherein said polyamide resin binder is a nylon having a softening point of 150° C. or more.

5. An electrothermic non-impact image transfer recording material as claimed in claim 4, wherein said nylon is selected from the group consisting of nylon 6, nylon 66, nylon 610, nylon 11 and nylon 12.

6. An electrothermic non-impact image transfer recording material as claimed in claim 1, wherein the ratio of the amount of said polyamide resin binder to said carbon black in said base layer is in the range of 70% to 97% by weight of said polyamide resin binder to 3% to 30% by weight of said carbon black.

7. An electrothermic non-impact image transfer recording material as claimed in claim 1, further comprising an intermediate layer which is interposed between said base layer and said ink layer, said intermediate layer comprising a resin.

8. An electrothermic non-impact image transfer recording material as claimed in claim 7, wherein said intermediate layer comprises a resin selected from the group consisting of vinyl chloride—vinyl acetate copolymer, vinyl chloride—vinylidene chloride copolymer, vinyl chloride—acrylonitrile copolymer, acrylic acid ester—acrylonitrile copolymer, acrylic acid ester—vinylidene chloride copolymer, acrylic acid ester—styrene copolymer, methacrylic acid ester—acrylonitrile copolymer, methacrylic acid ester—vinylidene chloride copolymer, methacrylic acid ester—styrene copolymer, urethane elastomer, nylon-silicone type resin, nitrocellulose—polyamide resin, polyvinyl fluorine, vinylidene chloride— acrylonitrile copolymer, butadiene-acrylonitrile copolymer, polyamide resin, polyvinyl butyral, cellulose acetate butylate, cellulose diacetate, cellulose triacetate, cellulose propionate, nitrocellulose, polycarbonate, styrene-butadiene copolymer, polyester resin, chlorovinyl ether—acrylic acid ester copolymer, amino resin, synthetic rubbers, thermoplastic resins and the mixtures of the above-mentioned polymers.

9. An electrothermic non-impact image transfer recording material as claimed in claim 7, wherein said intermediate layer further comprises a flexibilizing agent.

10. An electrothermic non-impact image transfer recording material as claimed in claim 9, wherein said flexibilizing agent is selected from the group consisting of phthalic acid ester, phosphoric ester, fatty acid ester, glycols and oils.

11. An electrothermic non-impact image transfer recording material as claimed in claim 7, wherein said intermediate layer comprises a resin selected from the group consisting of silicone resin, polymethyl methacrylate, polyethylene, polypropylene, fluorine-containing polymers, polyvinyl alcohol, binders containing inorganic oxide or carbonate, rubber chloride and myristic acid chromic chloride.

12. An electrothermic non-impact image transfer recording material as claimed in claim 7, wherein at least one layer of said base layer, said ink layer and said intermediate layer contains an inorganic or organic electroconductive material for adjusting the electric resistance of the layer.

13. An electrothermic non-impact image transfer recording material as claimed in claim 7, wherein the thickness of said ink layer is in the range of 1 μm to 10 μm, the thickness of said intermediate layer is in the range of 0.5 μm to 20 μm, and the thickness of said base layer is in the range of 0.5 μm to 20 μm.

14. An electrothermic non-impact image transfer recording material as claimed in claim 1, wherein the resin in said ink layer has a softening or melting point ranging from 50° C. to 200° C.

15. An electrothermic non-impact image transfer recording material as claimed in claim 14, wherein said resin is selected from the group consisting of a low molecular weight polystyrene, styrene-butyl methacrylate copolymer, a low molecular weight polyamide and the mixtures of the above-mentioned polymers.

16. An electrothermic non-impact image transfer recording material as claimed in claim 14, wherein said ink layer further comprises a component selected from the group consisting of waxes, oils and rosin.

17. An electrothermic non-impact image transfer recording material as claimed in claim 14, wherein said coloring component is selected from the group consisting of carbon black, phthalocyanine, alkali blue, spirit black, benzidine yellow, fast red, crystal violet, iron oxide and cadmium sulfide.

18. An electrothermic non-impact image transfer recording material as claimed in claim 1, wherein the thickness of said ink layer is in the range of 1 μm to 10 μm, and the thickness of said base layer is in the range of 0.5 μm to 20 μm.

19. An electrothermic non-impact image transfer recording material as claimed in claim 1, wherein at least one layer of said base layer and said ink layer contains an inorganic or organic electroconductive material for adjusting the electrical resistance of the layer.

20. An electrothermic non-impact image transfer recording material, comprising:
an electroconductive base layer comprising a uniform dispersion of from 3 to 30 wt. % of electroconductive carbon black in from 70 to 97 wt. % of an aromatic polyamide binder resin or a nylon binder resin, said binder resin having a softening point of at least 150° C., and
an electroconductive ink layer formed directly on said base layer, said ink layer comprising electroconductive coloring material uniformly dispersed in a second binder resin having a softening point in the range of from 60° to 120° C., said electroconductive ink layer having an electric resistnace $R_I$ which is different from the electric resistance $R_B$ of said base layer, so that $R_I > R_B$ when Joule's heat is to be generated in said base layer and $R_B > R_I$ when Joule's heat is to be generated is said ink layer, whereby said ink layer can be imagewise thermally transferred to a recording sheet.

21. An electrothermic non-impact transfer recording material, comprising:
an electroconductive base layer comprising a uniform dispersion of from 3 to 30 wt. % of electroconductive carbon black in from 70 to 97 wt. % of an aromatic polyamide binder resin or a nylon binder resin, said binder resin having a softening point of at least 150° C.,
an electroconductive intermediate layer formed directly on said base layer, said intermediate layer comprising a second resin having a softening point of at least 150° C.,
an electroconductive ink layer formed directly on said intermediate layer, said ink layer comprising electroconductive coloring material uniformly dispersed in a third binder resin having a softening point in the range of from 60° to 120° C., said electroconductive ink layer having an electric resistance $R_I$ which is related to the electric resistance $R_B$ of said base layer and the electric resistance $R_M$ of said intermediate layer so that $$R_M \geq R_I > R_B \text{ or } R_I > R_M > R_B$$

when Joule's heat is to be generated in said base layer and $$R_M \geq R_B > R_I \text{ or } R_B > R_M > R_I$$

when Joule's heat is to be generated in said ink layer, whereby said ink layer can be imagewise thermally transferred to a recording sheet.

* * * * *